United States Patent [19]

Takahashi

[11] Patent Number: 4,860,850
[45] Date of Patent: Aug. 29, 1989

[54] SADDLE RIDING TYPE VEHICLE

[75] Inventor: Hirotake Takahashi, Saitama, Japan

[73] Assignee: Honda Giken Kogyo Kabushiki Kaisha, Tokyo, Japan

[21] Appl. No.: 70,127

[22] Filed: Jul. 6, 1987

Related U.S. Application Data

[63] Continuation of Ser. No. 790,485, Oct. 23, 1985, abandoned.

[30] Foreign Application Priority Data

Oct. 26, 1984 [JP] Japan .................. 59-225398
Dec. 19, 1984 [JP] Japan .................. 59-268172

[51] Int. Cl.⁴ ............................. B62D 61/08
[52] U.S. Cl. .................. 180/215; 180/53.6; 74/15.69; 74/711
[58] Field of Search .......... 74/711, 710.5, 11, 15.69, 74/15.63, 714; 180/53.6, 53.1, 215, 70.1, 75.1, 73.1

[56] References Cited

U.S. PATENT DOCUMENTS

| | | | |
|---|---|---|---|
| 3,343,429 | 9/1967 | Frost | 74/711 |
| 3,656,573 | 4/1972 | Halberg | 74/711 |
| 3,776,353 | 12/1973 | Roth | 180/215 |
| 3,986,576 | 10/1976 | Cummins et al. | 74/15.69 |
| 3,987,689 | 10/1976 | Engel | 74/711 |
| 4,096,712 | 6/1978 | Webb | 74/711 |
| 4,372,416 | 2/1983 | Igarashi | 180/215 |
| 4,373,597 | 2/1983 | Itatani et al. | 74/15.63 |
| 4,452,100 | 6/1984 | Sullivan et al. | 74/711 |
| 4,535,866 | 8/1985 | Shiga | 180/215 |
| 4,540,061 | 9/1985 | Watanabe | 180/215 |
| 4,738,326 | 4/1988 | Inoue | 180/53.1 |

FOREIGN PATENT DOCUMENTS

| | | |
|---|---|---|
| 2300343 | 7/1973 | Fed. Rep. of Germany . |
| 2135791 | 11/1976 | Fed. Rep. of Germany . |
| 3025282 | 2/1982 | Fed. Rep. of Germany . |
| 58-136563A | 11/1983 | Japan . |
| 237242 | 11/1985 | Japan .................. 74/710.5 |
| 1357106 | 6/1974 | United Kingdom . |

Primary Examiner—Charles A. Marmor
Assistant Examiner—Karin Tyson
Attorney, Agent, or Firm—Lyon & Lyon

[57] ABSTRACT

A saddle riding type vehicle comprising a pair of right and left driving wheels, the wheels being driven by a power unit through a differential device, wherein there is provided a differential control device which increases differential torque of both the wheels in response to a rise of relative rotational speed of both the driving wheels.

2 Claims, 9 Drawing Sheets

SADDLE RIDING TYPE VEHICLE

This application is a continuation, of application Ser. No. 790,485, filed 10/23/85 now abandoned.

BACKGROUND OF THE INVENTION

1. Field of the Invention

The present invention relates to a saddle riding type vehicle mainly used for travelling on rough lands, and more particularly to a vehicle of the type wherein a pair of left and right driving wheels driven by a power unit are suspended at the front or rear portion of a vehicle body, each wheel having an extremely low pressure wide tire mounted thereon, and a saddle and a step are disposed at an intermediate and upper portion and a lower portion, respectively, of the vehicle body.

2. Description of the Prior Art

Generally, the vehicle of this kind is provided with a relatively lengthy step, and an operator or a driver operates the vehicle while moving his weight in all directions according to the condition of the rough land and to the running condition. It is often that one driving wheel is levitated from the ground during such running operation.

The vehicle of this kind has two types. One is that both the right and left driving wheels are integrally connected through a common axle driven by a power unit, and the other is that both the driving wheels are connected through a differential device.

In the former type, even if one of the right and left driving wheels is disengaged from the ground, the other driving wheel in the state in contact with the ground will not lose its driving force, and therefore, it has an excellent running property. On the other hand, when the vehicle is in a normal turning with both the driving wheels placed in contact with the ground, it is not possible to impart a rotational difference to both the driving wheels, thus producing the following inconveniences. That is, particularly, the tire of each driving wheel is of the extremely low pressure type, and when in normal turning operation, if a load imposed on each tire is varied under the influence of a centrifugal force acting on the vehicle body, the tire of the outer wheel at which applied load increases is compressed to suddenly reduce its radius in contact with the ground whereas the tire of the inner wheel inflates to suddenly increase the radius in contact with the ground. For this reason, a great difference occurs in the effective radius between both the driving wheels and in addition a difference in length of turning orbit between both the inner and outer wheels occurs, resulting in a severe slip between the inner wheel having a low ground contact force and the ground. As a result, the tire of the inner wheel may damage the lawn over a wide area and destroy the ridges of a farm.

In the latter type, it is possible to impart relative rotation to both the driving wheels even in the normal turning operation so that the vehicle can be operated without doing damage to the ground. However, when one of the driving wheels is disengaged from the ground, the other driving wheel in the state in contact with the ground will lose its driving force, deteriorating the running property.

In order to solve these problems, a proposal has been made in which a differential device is improved in such a manner that when a difference of rotational speed between both driving wheels occurs, a power from a power unit to the driving wheel on the high speed side is cut off. (See Japanese Patent Application Laid-Open No. 136563/83.)

According to such improved type of differential device as described above, the supply and cutoff of power to the high speed-side driving wheel to be effected according to the difference of rotational speed between both the driving wheels causes shocks to impair riding comfort. In addition, at the time of turning, only the inner side driving wheel is driven, and so a sufficient running property is not obtained therefrom.

SUMMARY OF THE INVENTION

The present invention has been achieved in view of the foregoing. It is an object of the invention to provide a saddle riding type vehicle of the type as described above in which in turning operation, relative rotation is imparted between both driving wheels while enabling both the driving wheels to display a driving force, and even when one of the driving wheels is floated from the ground, the other driving wheel in contact with the ground can exhibit a driving function to improve the running property and minimize the damage to the ground.

In order to achieve the above-described object, according to the present invention there is provided a saddle riding type vehicle in which a pair of left and right driving wheels driven by a power unit through a differential device are suspended at one of front and rear portions of a vehicle body, an extremely low pressure wide tire is mounted on each of the wheels, and a saddle and a step are disposed in an intermediate and upper portion and a lower portion, respectively, of the body, said differential device being provided with a differential control device which increases differential torque of both the driving wheels in response to a rise of relative rotational speed of both the driving wheels.

Since the differential torque of both the driving wheels is controlled to be increased in response to the increase in relative rotational speed of both the driving wheels, the differential torque of both the driving wheels is small when the vehicle makes a turning to allow the differential device to display its original differential function so that both the driving wheels may be driven continuously without doing damage to the ground and without requiring skill. When one of the driving wheels is disengaged from the ground, the differential torque immediately increases to restrain or control the differential function of the differential device whereby the driving force may be continuously transmitted to the driving wheel in contact with the ground. In either case, high running property may be obtained. Moreover, since when said one driving wheel comes into contact with the ground again, the relative rotational speed of both the driving wheels is low, the shock by the driving force is extremely small.

In addition to the above-described structure, it may be arranged that a bevel ring gear for inputting power from a power unit to the differential device is disposed concentric with the axle of the driving wheels, a power takeoff shaft having an output end exposed to the outside is supported on a housing which encases and supports these bevel ring gear and axle, and a driven bevel pinion leading to an input end of the power takeoff shaft is brought into engagement with the bevel ring gear. With this arrangement, whenever desired, input shafts of such as working machines can be coupled to this power takeoff shaft and these machines can be driven while running the vehicle. With this, vehicles of this kind, which have been so far exclusively used for motor sports, can also be used for working purposes and are particularly effective for running work in unlevelled or unpaved land such as farms, ranches and the like.

Particularly, owing to the arrangement that the power takeoff shaft is driven by the bevel ring gear through the driven bevel pinion, the position of the power takeoff shaft may be freely set by selection of the meshing position of the driven bevel pinion with the wide meshing portion of the bevel ring gear. Accordingly, the set position of the power takeoff shaft may be selected from the wide range in designing, allowing the shaft to positively adapt to works.

BRIEF DESCRIPTION OF THE DRAWINGS

FIGS. 1 to 6 show a first embodiment of the present invention.

FIGS. 7 and 8 show a second embodiment of the present invention.

FIGS. 10 and 11 show modified forms, respectively, of the mechanism connecting a bevel ring gear of the differential device to a power takeoff shaft.

DESCRIPTION OF THE PREFERRED EMBODIMENTS

Figure 1:
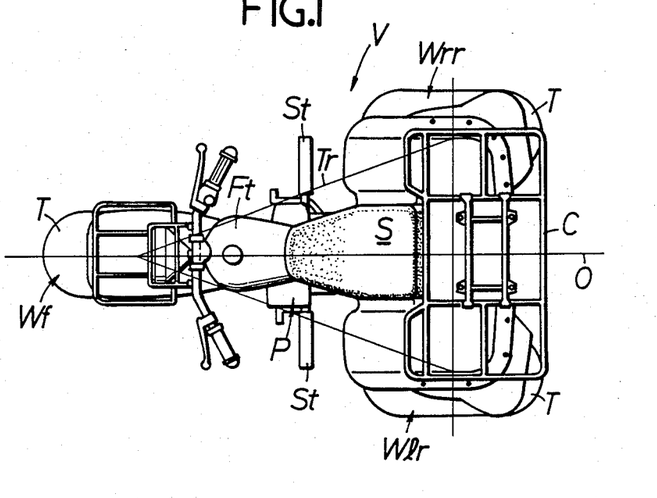
FIG. 1 is a plan view of a saddle riding type vehicle.
Figure 2:
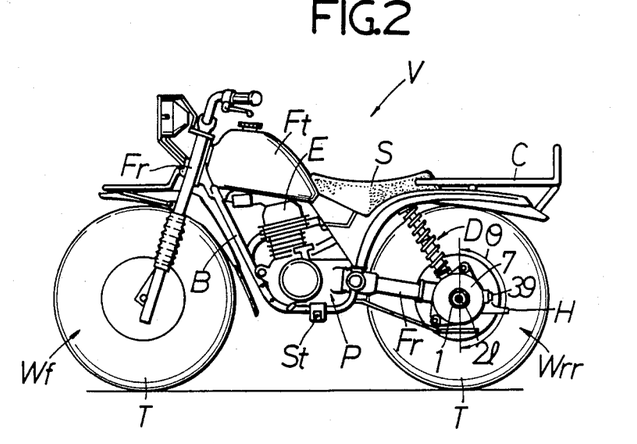
FIG. 2 is a side view of the vehicle showing a state with a front-side driving wheel removed.
Figure 3:
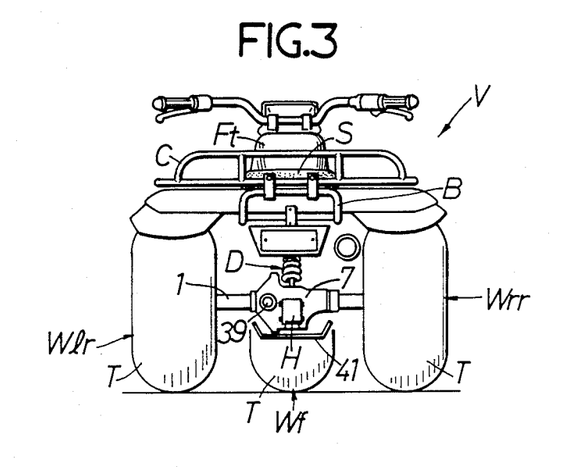
FIG. 3 is a rear view thereof.

Embodiments of the present invention will now be described with reference to the drawings. First, a first embodiment of the present invention will be described with reference to FIGS. 1 to 6. Referring to FIGS. 1 to 3, a saddle riding type vehicle V comprises a power unit P including an engine E mounted in a central portion of a body B, a steering wheel Wf at the front portion of the body B, and a pair of right and left driving wheels Wlr, Wrr. The wheels Wf, Wlr and Wrr each has a wide extremely low pressure tire T, for example, a so-called balloon tire whose air pressure is less than 1 kg/cm$^2$, mounted thereon. At an upper part of the body B are disposed a fuel tank Ft, a saddle S and a carrier C in order from the front thereof, and at a lower part of the body B are disposed a pair of right and left rod-like steps St and St. These steps St and St are formed to have such a long length as to project at their tip ends outwardly of a region of triangle Tr which connects the ground contact points of three wheels Wf, Wlr and Wrr in order to facilitate the adjustment of contact pressure or contact state with the ground of the wheels Wf, Wlr and Wrr through weight shifting by an operator.

The steering wheel Wf is supported on a front fork Ff steerably connected to the front end of the body B. The driving wheels Wlr and Wrr are carried on a support cylinder 1 at the tip end of a rear fork Fr which is connected for up and down swing motion to the rear end of the body B. A damper D with a suspension spring is interposed between the body B and the rear fork Fr on a longitudinal center line O of the body B.

Figure 4:
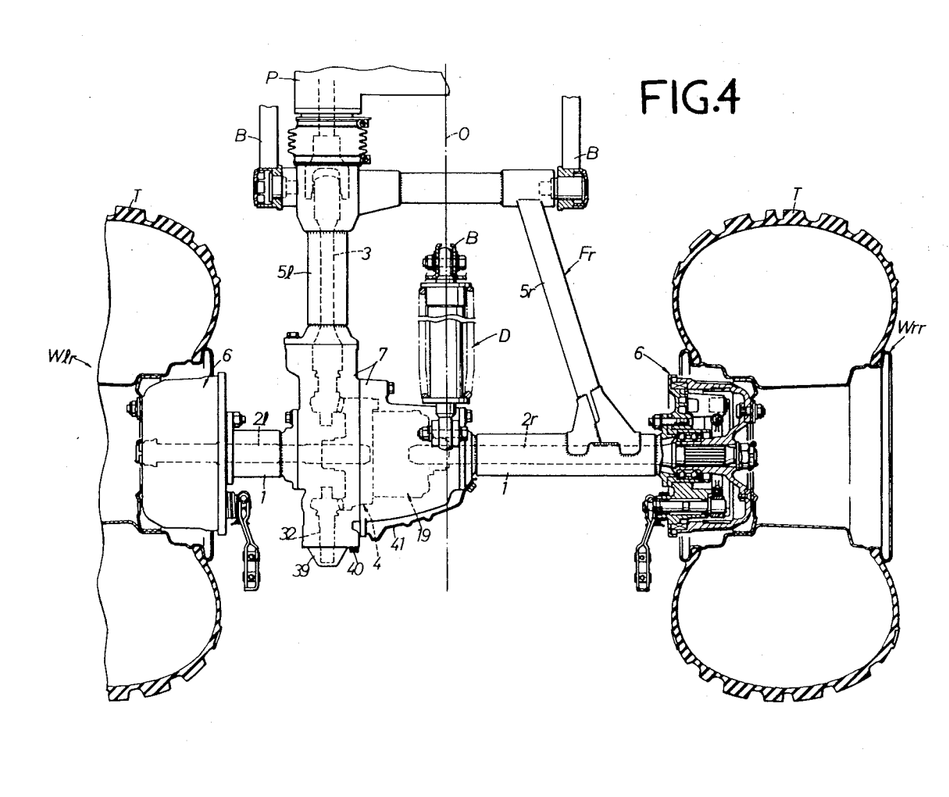
FIG. 4 is a partly longitudinally sectioned enlarged plan view of both right and left driving wheels and portions therearound.

Referring to FIG. 4, a pair of left and right axles 2l and 2r connected to the driving wheels Wlr and Wrr, respectively, are disposed oppositely to each other within the support cylinder 1. A differential device 4 driven by the power unit P through a propeller shaft 3 is interposed between the axles 2l and 2r. The rear fork Fr has a pair of left and right hollow legs 5l and 5r with the damper D sandwiched therebetween. The propeller shaft 3 is disposed in a hollow portion of the left leg 5l.

Brake mechanisms 6 and 6 are provided on the driving wheels Wlr and Wrr, respectively.

Figure 5:
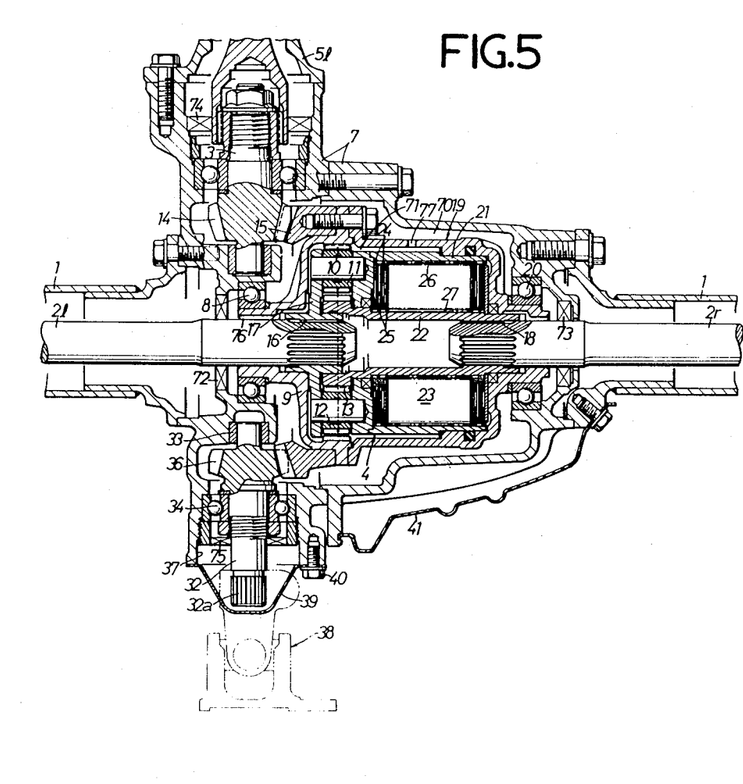
FIG. 5 is a longitudinally sectioned plan view of a differential device and a differential control device.

Referring to FIG. 5, the differential device 4 is disposed in a housing 7 integrally formed on an intermediate portion of the support cylinder 1. This differential device 4 comprises a differential case 9 carried rotatably around axes of both the axles 2l and 2r through bearings 8 and 20 on the housing 7, an internal gear 10 formed on the inner peripheral surface of the differential case 9, a first planetary gear 11 meshed with the internal gear 10, a second planetary gear 12 meshed with the first planetary gear 11, and a sun gear 13 meshed with the second planetary gear 12, thus being constituted as a planetary gear type. The differential case 9 is connected to the propeller shaft 3 through a driving bevel pinion 14 and a bevel ring gear 15, which are meshed with each other, so as to drive the differential case 9 at a reduced speed from the propeller shaft 3. The first and second planetary gears 11 and 12 are rotatably supported on a carrier 17 spline-coupled at 16 to the left axle 2l, and the sun gear 13 is spline-coupled at 18 to the right axle 2r.

A differential control device 19 is provided between the carrier 17 and the sun gear 13. The differential control device 19 comprises a clutch outer member 21 provided on the carrier 17, and a cylindrical clutch inner member 22 provided on the sun gear 13 and encircled by the member 21.

The outer member 21, which has a bottomed cylindrical shape, has an open end relatively rotatably closely fitted in the inner peripheral surface of the differential case 9 so as to define a closed oil chamber 23 between the clutch outer and inner members 21 and 22.

Encased in the closed oil chamber 23 are a plurality of alternately superposed annular outer clutch plates 24 and inner clutch plates 25, the outer clutch plates 24 being axially slidably engaged with the clutch outer member 21 through a spline 26, and the inner clutch plates 25 being axially slidably engaged with the clutch inner member 22 through a spline 27.

High viscous oil and a small quantity of air which allows thermal expansion of the oil are sealed into the closed oil chamber 23.

Figure 6A:
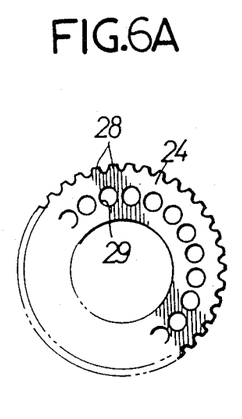
FIGS. 6A and 6B are respectively plan views of an outer clutch plate and an inner clutch plate of the differential control device.
Figure 6B:
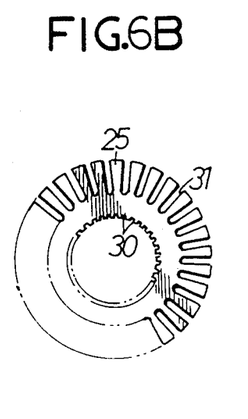

As shown in FIGS. 6A and 6B, the outer clutch plate 24 is provided with a number of teeth 28 for engagement with the spline 26 of the clutch outer member 21 and a number of oil ports 29 through which the oil passes, and the inner clutch plate 25 is provided with a number of teeth 30 for engagement with the spline 27 of the clutch inner member 22 and a number of oil grooves 31 through which the oil passes.

An outer lubricating oil chamber 70 is defined within the housing 7 by oil seals 72, 73, 74 and 75 to lubricate the differential device 4, bearings 8, 20, 34 and the like, and an inner lubricating oil chamber 71 is formed within the differential case 9. Both the oil chambers 70 and 71 are brought into communication with each other through an oil groove 76 and an oil port 77 provided in the differential case 9 to provide a flow of lubricating oil between the oil chambers 70 and 71.

Turning again to FIG. 5, a power takeoff shaft 32 is rotatably carried at the rear of the housing 7 through the bearings 33 and 34. This power takeoff shaft 32 is integrally formed with a driven bevel pinion 36 meshed with the bevel ring gear 15 at a position between the bearings 33 and 34. The shaft 32 is provided at the rear end thereof with a joint portion 32a formed with serrations. This joint portion 32a is projected from a power takeoff opening 37 which opens to the rear wall of the housing 7, which joint portion can be connected through a joint 38 to the input shaft of a sprinkler, a drug sprinkler, a lawn mower, a cultivator and other working devices, when necessary. The power takeoff shaft 32 is suitably positioned in the range θ of 180° (see FIG. 2) around and at the rear of the axles 2l and 2r.

When the power takeoff shaft 32 is not in use, the power takeoff opening 37 is closed by a cap 39, the cap 39 being fixedly secured to the housing 7 by means of a bolt 40.

A hitch H for a trailer (see FIGS. 2 and 3) is fixedly secured to the rear surface of the housing 7.

In FIG. 5, reference numeral 41 denotes a protector plate to cover the lower portion of the housing 7.

The operation of the above-described embodiment will be described hereinafter.

When the left and right driving wheel Wlr and Wrr are relatively rotated, the planetary gears 11 and 12 rotate on their axes whereby the outer member 21 connected to the left axle 2l through the carrier 17 and the inner member 22 connected to the right axle 2r similarly relatively rotate. Then the outer clutch plate 24 and the inner clutch plate 25 relatively rotate while shearing the high visous oil which is present therebetween. At that time, the oil port 29 and the oil groove 31 of the clutch plates 24 and 25 retain oil and contribute to effective shearing of the oil.

Under the condition that oil temperature is relatively low, transmission torque or differential torque between the driving wheels Wlr and Wrr is decided by the shearing torque of that oil.

Figure 9:
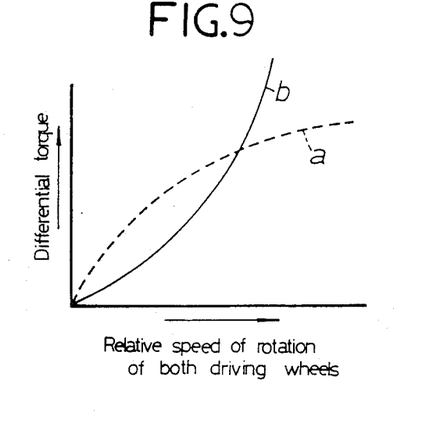
FIG. 9 is a graph showing the differential torque characteristics, FIG. 9 having a curve a according to the first embodiment and a curve b according to the second embodiment.

When the relative rotational speed of the driving wheels Wlr and Wrr increases, the oil rises in temperature by the shearing energy given from the clutch plates 24 and 25. At the outset, the differential torque decreases due to the lowering of viscosity resulting from the rise of oil temperature. However, when the relative rotational speed exceeds a predetermined value, a complicated temperature gradient occurs in the clutch plates 24 and 25 due to abrupt rise of the oil temperature, and therefore some clearances between the adjoining inner and outer clutch plates 24 and 25 are made extremely small due to a geometrical effect of distortion caused by that temperature gradient and a pressure increase within the closed oil chamber 23 resulting from the rapid rise of oil temperature. Thus the shearing torque of oil at those clearances increases. As a result, the differential torque increases as the relative rotational speed of the driving wheels Wlr and Wrr increases, as shown by curve a in FIG. 9.

Accordingly, when the vehicle is in its normal turning, there is generated a great difference in effective radius between the extremely low pressure tires T and T of the driving wheels Wlr and Wrr due to excessively different deformations between the tires T and T, and the driving wheels Wlr and Wrr are relatively rotated by the function of the differential device 4. However, in a range of the relative rotational speed of the driving wheels Wlr and Wrr caused in such normal turning, the differential torque by the differential control device 19 is controlled to be small. Therefore, the differential device 4 displays its original differential function so that the driving wheels Wlr and Wrr may be accurately differentiated while transmitting the driving torque from the power unit P to the wheels Wlr and Wrr.

In the event that one of the driving wheels Wlr and Wrr is disengaged from the ground, if the relative rotational speed of the driving wheels Wlr and Wrr increases, the differential torque is immediately increased by the differential control device 19. Therefore, the differential function of the differential device 4 is restrained or controlled so that the driving force may be continuously transmitted to the driving wheel Wrr or Wlr which is in contact with the ground.

Even at a moment the driving wheel Wlr or Wrr which had been levitated is brought into contact with the ground, the driving forces of the driving wheels Wlr and Wrr are approximately balanced, because the relative rotational speed of the wheels Wlr and Wrr is small, to give no shock to the operator.

In case the saddle riding type vehicle V is used, for example, as a working vehicle for driving a sprinkler, a trailer with the sprinkler mounted thereon is connected to the hitch H and an input shaft of the sprinkler is connected to the power takeoff shaft 32 through the joint 38 and thereafter the vehicle is operated to run. Then, the vehicle V hauls on the trailer for the sprinkler through the hitch H and at the same time, a part of the rotational torque of the bevel ring gear 15 driving the axles 2l and 2r is transmitted to the input shaft of the sprinkler through the driven bevel pinion 36 and the power takeoff shaft to drive the same, whereby the sprinkling operation is accomplished.

Next, a second embodiment of the present invention will be described with reference to FIGS. 7 and 8.

Figure 7:
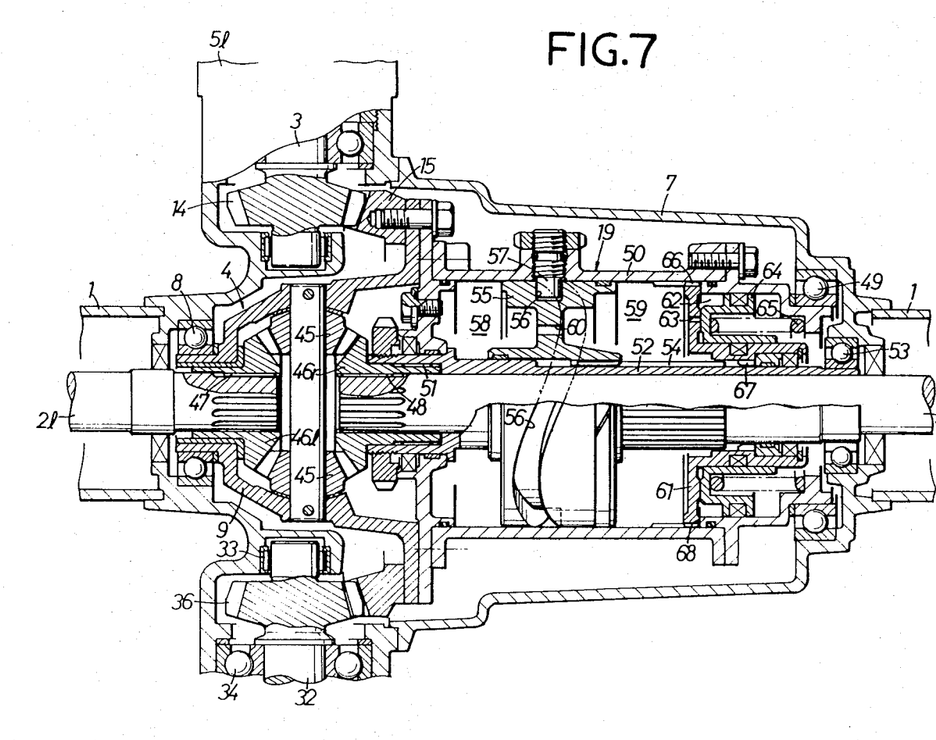
FIG. 7 is a longitudinal sectioned plan view of a differential device and a differential control device.
Figure 8:
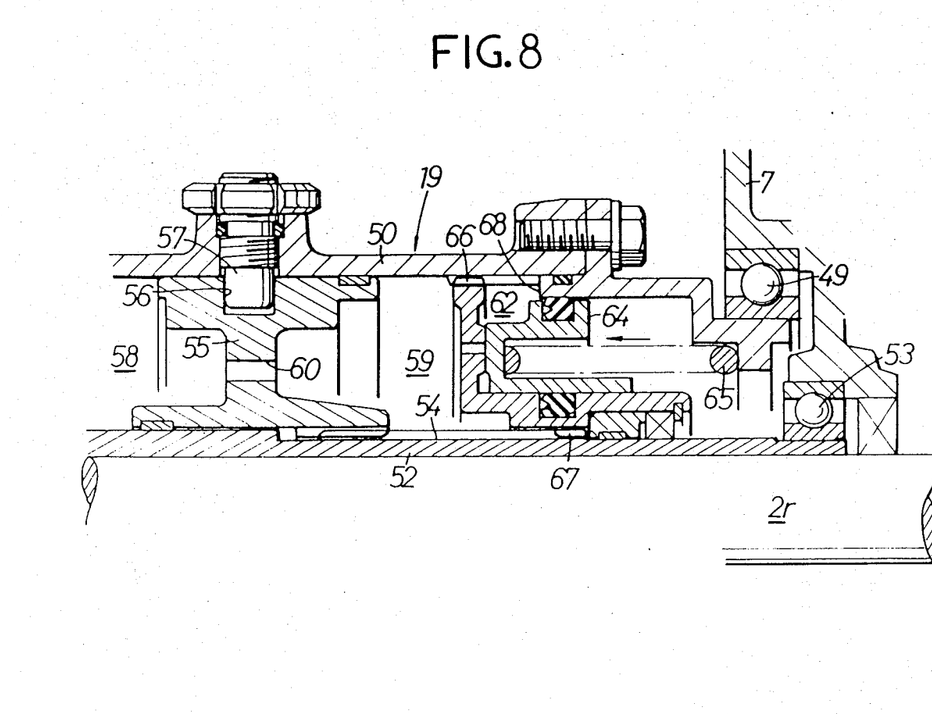
FIG. 8 is a sectional view showing a state where the differential control device is actuated to lock the differential device.

Referring to FIG. 7, a differential device 4 is formed into a known bevel gear type which comprises a plurality of pinions 45 and a pair of left and right side gears 46l and 46r within a differential case 9. The left and right side gears 46l and 46r are spline-coupled at 47 and 48 to left and right axles 2l and 2r.

A differential control device 19 is provided between the differential case 9 and one side gear 46r on one axle 2r. That is, the differential control device 19 is composed of a cylinder 50 fixedly secured to the differential case 9 and rotatably carried on the housing 7 through a bearing 49, the cylinder 50 being fully filled therein with buffer oil, a driving tube 52 fitted over the axle 2r so as to extend through the cylinder 50, the tube 52 being spline-coupled at 51 to the side gear 46r and carried rotatably but axially immovably on the housing 7 through a bearing 53, a piston 55 rotatably and slidably fitted in the cylinder 50 and slidably fitted in the driving tube 52 through a spline 54, a guide pin 57 fixedly mounted on the cylinder 50 and in engagement with an endless cam groove 56 formed in the outer peripheral surface of the piston 55, and an orifice 60 bored in the piston 55 to provide communication between left and right oil chambers 58 and 59 within the cylinder 50 defined by the piston 55.

The cylinder 50 is provided with an auxiliary oil chamber 62 adjacent to one oil chamber 59 with an end wall plate 61 sandwiched therebetween, the plate 61 being formed with a through-hole 63 to provide communication between the adjoining oil chambers 59 and 62. The auxiliary oil chamber 62 is defined by an auxiliary piston 64 in sliding contact with the cylinder 50, the auxiliary piston 64 being normally biased by the springing force of a spring 65 in a direction of reducing the volume of the auxiliary oil chamber 62. The end wall plate 61 is slidably spline-coupled at 66 to the cylinder 50, and at the inner peripheral surface thereof is formed a spline 67 which is engageable with the spline 54 of the driving tube 52, these splines being normally in a disengaged state. The spline 67 comes into engagement with the spline 54 of the driving tube 52 when the end wall plate 61 has moved at a predetermined stroke from a normal position in contact with a shoulder 68 on the inner peripheral surface of the cylinder 50 toward the piston 55.

Other structures are similar to those of the previously-described embodiment. In the drawings, parts corresponding to those of the previous embodiment bear the same reference numerals.

The operation of the second embodiment will be described hereinafter. When the axles 2l and 2r are relatively rotated, idling of the pinion 45 causes relative rotation between the cylinder 50 fixed to the differential case 9 and the driving tube 52 fixed to the side gear 46r whereby the piston 55 is rotated and driven by the driving tube 52. Therefore, the piston 55 is laterally or axially reciprocatingly moved within the cylinder 50 by the mutual action of the guide pin 57 and the endless cam groove 56. With this reciprocating movement, transfer of buffer oil takes place between the left and right oil chambers 58 and 59 through the orifice 60. When the buffer oil passes through the orifice 60, an attenuating force is generated to create differential torque of the axles 2l and 2r.

When the relative rotational speed of the axles 2l and 2r is low, the sliding speed of the piston 55 is also low. Therefore, the attenuating force generated in the orifice 60 is small. This attenuating force increases as the relative rotational speed increases. As the result, the differential torque of the axles 2l and 2r increases as the relative rotational speed of the axles 2l and 2r or the driving wheels increases, as shown by the line b of FIG. 9.

Accordingly, similarly to the previous embodiment, when the vehicle makes a turning the differential torque of the driving wheels is controlled to be small by the differential control device 19, and the differential device 4 displays its original differential function. When one of the driving wheels is levitated, the differential torque is increased by the differential control device 19 to restrain or control the differential function of the differential device 4.

When the buffer oil within the oil chambers 58 and 59 is thermally expanded by the operation of the differential control device 19 as described above, the auxiliary piston 64 is moved backward against the force of the spring 65 according to the rise of pressure caused by the thermal expansion to increase the volume of the auxiliary oil chamber 62. Thus a thermally expanded portion of the oil within the oil chambers 58 and 59 moves to the auxiliary oil chamber 62 through the through-hole 63 to prevent pressure of the oil chambers 58 and 59 from being excessively increased.

In this embodiment, if the buffer oil is discharged from the cylinder 50, the differential device 4 can be locked. That is, if the buffer oil is discharged, the end wall plate 61 is urged toward the piston 55 by the auxiliary piston 64 through the force of the spring 65 and therefore, the end wall plate 61 remains spline-coupled at 66 to the cylinder 50 and newly bring the spline 67 in the inner periphery thereof into engagement with the spline 54 of the driving tube 52 as shown in FIG. 8. As the result, the cylinder 50 and the driving tube 52 are integrally connected through the end wall plate 61 to prevent the differential case 9 and the side gear 46r from relative rotation, whereby the rotation of the differential case 9 can be always transmitted to the driving axles 2l and 2r at the same time.

It is to be understood that even if the present invention is applied to a saddle riding type four-wheel vehicle provided with a pair of right and left steering wheels, operation and effects similar to those of the above-described embodiments may be achieved, in which case, both the steering wheels may also be used as driving wheels and the present invention may be applied to those steering wheels.

Figure 10:
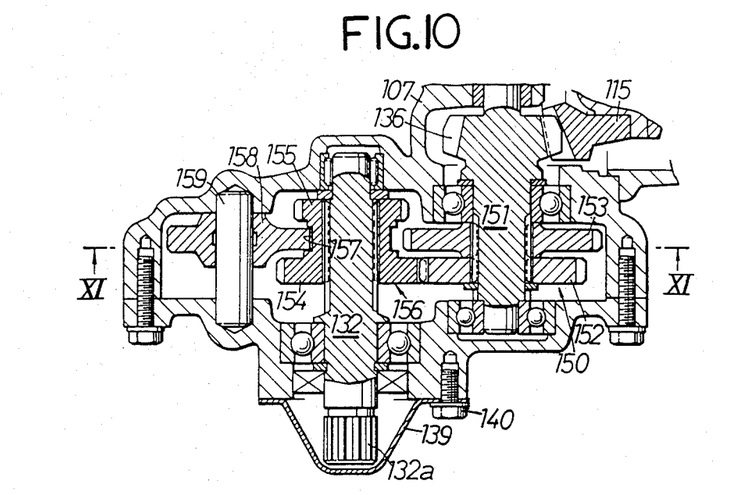
FIG. 10 being a longitudinal sectional plan view of a peripheral portion of the power takeoff shaft, and FIG. 11 being a sectional view taken on line XI—XI of FIG. 10.
Figure 11:
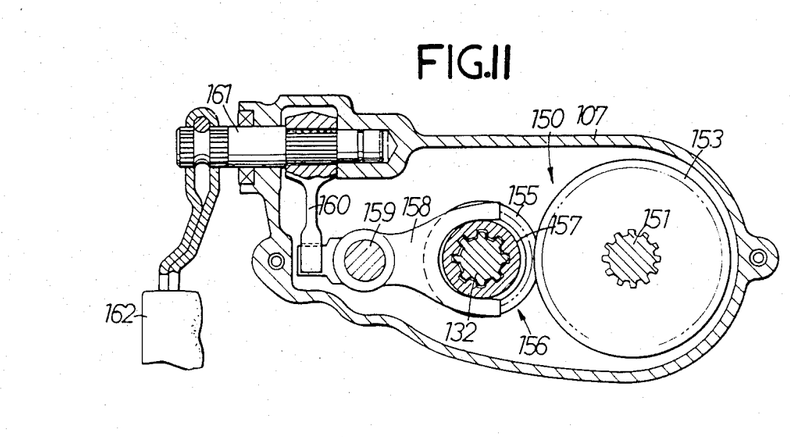

FIGS. 10 and 11 show a modified form of auxiliary power takeoff portion including the power takeoff shaft 32 in the aforesaid embodiments, which is similar to the previously described embodiments in structure except that a driven bevel pinion 136 is separated from a power takeoff shaft 132, and they are connected through a speed change gear 150. More specifically, a relay shaft 151 integral with the driven bevel pinion 136 is carried together with the power takeoff shaft 132 on a housing 107 in parallel to each other, and the speed change gear 150 is provided between the shafts 151 and 132. The speed change gear 150 is composed of a pair of large and small driving gears 152 and 153 spline-coupled integral with the relay shaft 151, and a shift gear 156 consisting of a pair of mutually integrally connected large and small driven gears 154 and 155 which are alternately engageable with the driving gears 152 and 153, this gear 156 being slidably spline-coupled to the power takeoff shaft 132. When the shift gear 156 is shifted in an axial direction of the power takeoff shaft 132 to obtain alternate engagement of between the driving gear 152 and the driven gear 154 and between the driving gear 153 and the driven gear 155, the rotational ratio of the power takeoff shaft 132 with respect to the relay shaft 151 can be switched in two stages to impart a rotational speed suited to the working condition of a working machine to the power takeoff shaft 132.

For the shifting of the shift gear 156 there are provided a shift fork 158 in engagement with an outer peripheral groove 157 of the shift gear 156, a guide shaft 159 carried on the housing 107 parallel to the power take-off shaft 132 to guide the shifting operation of the shift fork 158, a shift lever 160 operatively connected to the shift fork 158 to operate the latter, an operating shaft 161 connected to the shift lever 160 and carried rotatably on the housing 107, and an operating lever 162 connected to the outer end of the operating shaft 161. When the operating shaft 161 is turned by the operating lever 162, the shift lever 160 is also turned to impart a shifting operation to the shift fork 158.

What is claimed is:

1. A saddle type riding vehicle having a pair of driving wheels comprising:
   a body;
   a power unit mounted on said body;
   a drive pinion rotatably driven by said power unit;
   a pair of axially aligned, oppositely extending, independently rotatable wheel axles mounting the driving wheels of said vehicle;
   a housing supported by said body containing means for rotatably mounting said drive pinion and said wheel axles;
   a differential mechanism in said housing drivingly connecting said wheel axles to said drive pinion, said differential mechanism comprising a differential case attaching an external ring gear drivably connected to said drive pinion and an internal ring gear, a plurality of planetary gears drivably connected to said internal ring gear, a planetary gear carrier drivably connected to one of said wheel axles and a sun gear driven by said planetary gears drivably connected to the other of said wheel axles;
   a differential control means within said housing operative to increase the differential torque to said wheel axles in response to an increase in relative rotational velocity therebetween, said differential control means comprising a cylindrical wall connected to one of said axles in concentrically spaced relation from the axis thereof to form a substantially closed chamber, said chamber containing a fluid body and alternately disposed first and second clutch plates movably connected to said cylindrical wall and to the other wheel axle, respectively, said fluid body immersing said clutch plates, whereby reactive forces imposed on said clutch plates due to relative movement between said clutch plates and said fluid body in response to differential rotational movement between said axles operates to retard said differential rotational movement; and
   a power takeoff shaft rotatably mounted on and extending through said housing, one end of said shaft disposed within said housing and mounting an input gear engaging said ring gear and the other end of said shaft being disposed exteriorly of said housing and containing means for selectively drivingly connecting a work producing apparatus.

2. A saddle type riding vehicle having a pair of driving wheels comprising:
   a body;
   a power unit mounted on said body;
   a drive pinion rotatably driven by said power unit;
   a pair of axially aligned, oppositely extending, independently rotatable wheel axles mounting the driving wheels of said vehicle;
   a housing supported by said body containing means for rotatably mounting said drive pinion and said wheel axles;
   a differential mechanism in said housing drivingly connecting said wheel axles to said drive pinion, said differential mechanism comprising a differential case attaching an external ring gear drivably connected to said drive pinion and an internal ring gear, a plurality of planetary gears drivably connected to said internal ring gear, a planetary gear carrier drivably connected to one of said wheel axles and a sun gear driven by said planetary gears drivably connected to the other of said wheel axles; and
   a differential control means within said housing operative to increase the differential torque to said wheel axles in response to an increase in relative rotational velocity therebetween, said differential control means comprising a cylindrical wall connected to one of said axles in concentrically spaced relation from the axis thereof to form a substantially closed chamber, said chamber containing a fluid body and alternately disposed first and second clutch plates movably connected to said cylindrical wall and to the other wheel axle, respectively, said fluid body immersing said clutch plates, whereby reactive forces imposed on said clutch plates due to relative movement between said clutch plates and said fluid body in response to differential rotational movement between said axles operates to retard said differential rotational movement.

* * * * *